May 14, 1946. D. C. WISELEY 2,400,278
INERTIA OPERATED CIRCUIT MAKER AND BREAKER
Original Filed Oct. 13, 1942 2 Sheets-Sheet 2

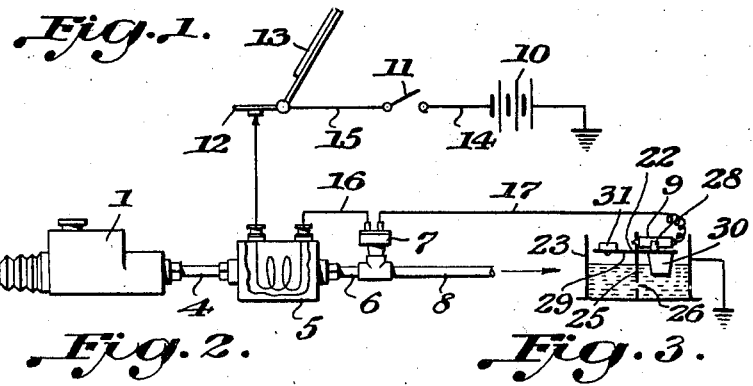

Inventor,
Don C. Wiseley.
By Hammond + Dupont
attys.

Patented May 14, 1946

2,400,278

UNITED STATES PATENT OFFICE 2,400,278

INERTIA OPERATED CIRCUIT MAKER AND BREAKER

Don C. Wiseley, Los Angeles, Calif.

Original application October 13, 1942, Serial No. 461,864. Divided and this application June 2, 1943, Serial No. 489,398

9 Claims. (Cl. 200—84)

This invention relates to improvements in inertia operated circuit makers and breakers for electric control circuits. More particularly, it relates to fluid balanced electric switches arranged for attachment to a motor vehicle or other movable body so that the switch will maintain one condition of the circuit under normal operation or movement of the body, to which it is attached, but will automatically operate to change the condition of the circuit when movement of the carrying body is retarded, such as by application of the brakes on a vehicle or by other retarding means. The illustrated embodiment of the invention is particularly designed for use with the electrical control circuit of a fluid pressure brake system wherein means are provided for trapping fluid under pressure in the wheels of a vehicle braking system to lock the brakes of the vehicle under certain conditions to prevent movement of the vehicle. A fluid pressure brake system of the character referred to is shown and claimed in my copending application Ser. No. 461,864, filed October 13, 1942, this being a division of said application.

It is one of the objects of the invention to provide a fluid balanced inertia operated switch for attachment to a motor vehicle or other movable body so as to maintain a normal circuit control position under normal movement of the body to which it is attached but which is automatically operable to a changed circuit control position when movement of the carrying body is retarded.

It is a further object of the invention to provide a tiltable mercury switch in buoyancy relation with fluid within a container so that the switch is automatically operable by the shifting of the position of the fluid within the container.

It is also an object of the invention to provide a novel fluid balanced tiltable mercury switch.

Other objects and advantages of the invention will become apparent from the detailed specification which follows and by reference to the accompanying drawings forming a part thereof, wherein—

Figure 1 is a diagrammatic view of a fluid brake holding system having in its control circuit a preferred embodiment of the invention.

Figure 2 is a side view partly in section showing one embodiment of the invention.

Figure 3 is a cross sectional view of the device of Fig. 2, the view being taken on line 3—3 of Fig. 2.

Figure 4 is a top sectional view taken on line 4—4 of Figure 2.

Figure 5:
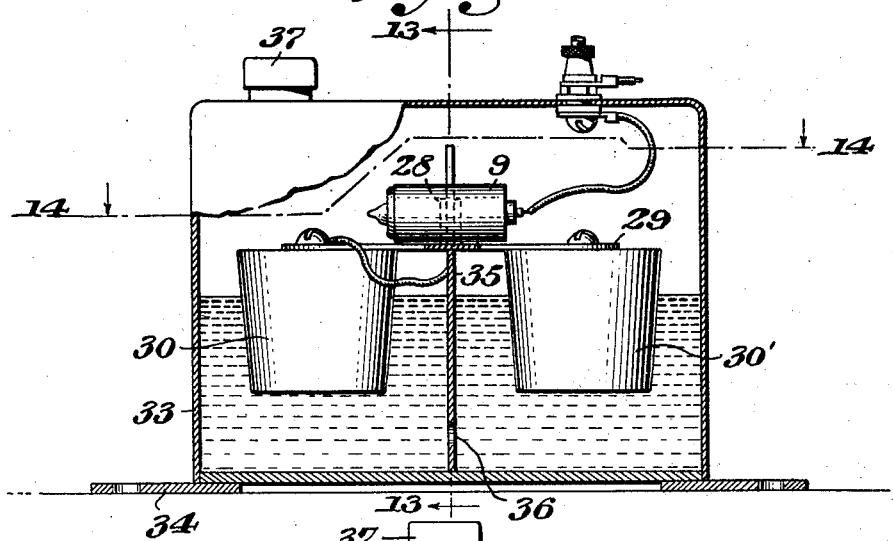
Figure 5 is a side view partly in section showing a modified form of the invention.
Figure 6:
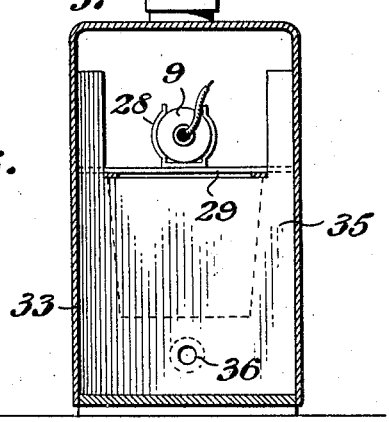
Figure 7:
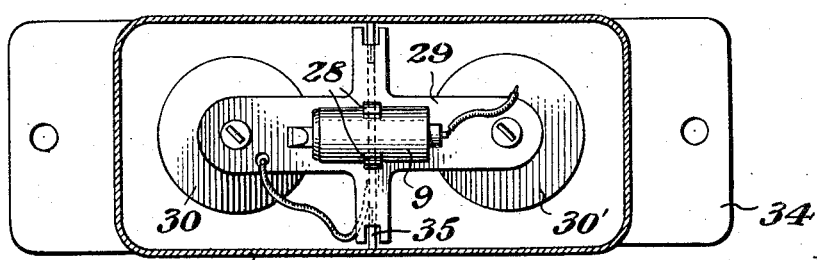

Figures 6 and 7 are vertical and horizontal sectional views of the device of Fig. 5, said views being taken on lines 13—13, and 14—14, respectively of Fig. 5.

Having reference to the drawings and to the diagrammatic showing of Fig. 1, the invention in one of its forms is shown in the control circuit of a fluid brake system of a motor vehicle. The arrangement which illustrates an important use of the invention consists of the conventional master cylinder 1, brake pedal 2, and piston connection 3, whereby fluid from the master cylinder is adapted to be forced by operation of the brake pedal from the master cylinder to the wheel cylinders for operation of the wheel brakes in a conventional manner. In the arrangement illustrated, the fluid passes from the master cylinder by way of pipe connection 4, the hydroelectric valve 5, and conduit 6 leading to the wheel cylinders, not shown. A hydraulic pressure operated electric switch 7 is responsive to prevailing pressure conditions in the line 6.

An electrical control circuit is provided in cooperation with the fluid pressure system and includes therein a solenoid coil of the hydroelectric valve 5, the pressure control switch 7 and a tiltable mercury inertia switch 9. This circuit which is also inclusive of battery 10, ignition switch 11 and switch 12 operated by the accelerator pedal 13, may be traced from battery 10, having one side thereof grounded, by way of lead 14, ignition switch 11, lead 15, pedal switch 12, solenoid coil of hydroelectric valve 5, lead 16, hydraulic pressure switch 7, lead 17, mercury switch 9 of an inertia operated device and then to ground. The circuit arrangement provides four separate points where the series circuit may be broken.

The hydroelectric valve 5 is installed in the brake fluid line between the master cylinder and the front or rear wheel cylinders of the braking system of both and is designed, when operated, to close and trap the brake fluid within the wheel cylinders to lock the brakes in their operated position. The valve, briefly described, is of the solenoid type with its operating coil included in the electric control circuit, and its arrangement is such that, normally, the valve will allow unimpeded flow from the master cylinder to the wheel cylinders or vice-versa, but when energized, it will check or prevent flow from the wheel cylinders to the master cylinder, while still permitting flow in the original direction. Thus, when operated, the valve causes the fluid to be trapped within the wheel cylinders to hold the brakes in operated position.

The hydraulic switch 7 is so positioned as to be open to the brake fluid line between the hydroelectric valve and the wheel cylinders, being designed to close the electric circuit when pressure of the brake fluid is increased by pressure on the brake pedal. The switch holds the circuit closed as long as the brake fluid pressure is maintained in the fluid lines but it is normally open when pressure is not applied to the brake pedal. The accelerator operated switch 12 is so arranged as to be normally closed when the accelerator pedal is not depressed but is operated to open position when the accelerator pedal is depressed so as to open the control circuit. The circuit is completed from the switch 7 to ground by way of the fluid balanced switch of this invention.

Briefly described, the operation of the system of Fig. 1, is as follows: The pedal operated switch is normally closed when the pedal is not depressed as is the practice when the vehicle is being brought to a stop. The operating circuit is normally open at the fluid pressure operated switch 7 and is normally closed at the inertia switch 5. In retarding the progress of the vehicle by fluid pressure applied through the brake lines, the fluid pressure switch becomes closed and by reason of its construction the inertia switch opens while the forward progress of the vehicle is being arrested by the brakes. The inertia switch is so constructed and arranged that the control circuit remains open at this point until the vehicle is brought substantially to a complete stop. With the circuit closed at all switches, the solenoid of the hydroelectric valve is energized to close the valve so as to prevent return to the master cylinder of the fluid under pressure in the brake lines and the wheel cylinders. Depression of the accelerator pedal opens the circuit, allowing the solenoid valve to open and the release of the brakes. The inertia operated switches act as disabling agencies in the electric control circuit while the vehicle is being brought to a stop to prevent premature locking of the brakes. The arrangement is such, however, that the usual driving practice of momentarily operating and releasing the brakes while the car is in motion is not made ineffective.

The preferred embodiment of inertia operated switch of this invention is illustrated in Figs. 2 to 4 of the drawings. The structure consists of the mercury switch 9 mounted in suitable clips 28 on the upper side and adjacent one end of a lever arm 29, the arm also supporting on its lower side under the switch position a float 30, and at the opposite end of the arm a small counterweight 31. The lever arm is pivotally supported intermediate its ends by pivotal connections 22 within a compartmented fluid containing vessel 23 fixed to a suitable support 24 by which it may be mounted as desired on the vehicle. The container is divided into two compartments by the partition wall 25, with the two compartments being in communication with each other through a small opening or port 26 in the lower portion of the partition or wall. The container is filled with a suitable fluid so that the height of the fluid in the compartments in contact with the float member tends to maintain the lever arm balanced and approximately level with respect to the level of the fluid. Maintenance of the fluid at its predetermined level is of particular importance in this form of the device since it affects the level of the arm to which the mercury switch is attached. A filling spout 27 with removable cap is provided for filling the container.

The preferred height of the fluid in container 23 would be that at which, when the car is at rest, the mercury within the mercury switch would just touch and bridge the contacts of the switch. If the level of the fluid be substantially higher than that predetermined for best operation, the mercury switch would slant downwardly causing the mercury to move away from its contact to break the circuit. Conversely, if the level of the fluid be too low, the device would be less sensitive as movement of the mercury would necessarily be somewhat uphill and greater force would be required to move the mercury away from its contacting point. The preferred arrangement is particularly sensitive to car speed as in actual operation it is influenced by the force of gravity. Since the weight of the lever is high and above the pivot point, it is somewhat topheavy so that its inertia exerts influence upon the mass of the lever arm, but the pivot points resist its movement in a horizontal direction and the forward end of the lever tends to dip downwardly. Gravity thereupon exerts its influence and the movement of the mercury away from its circuit making or contacting point is thereby accelerated.

In Fig. 5 of the drawings, there is illustrated a modified form of inertia switch which in all respects, except for its lever arm arrangement and switch arrangement is substantially like that of the preferred form previously described. The lever arm 29 in lieu of being equipped with a counterweight at one end, as previously described, has at each end thereof on its lower side, the floats 30 and 30', and the mercury switch is supported substantially at the middle point of the lever arm above its pivotal support. The level of the fluid contacting the floats at each end of the lever arm tends to keep the lever arm balanced and approximately level with respect to the level of the fluid. The mercury switch 9 at the midpoint of the lever arm is so arranged that it will close the circuit when the vehicle is on a level or up or down hill grade. In this arrangement, should the forward progress of the vehicle be arrested, as by application of the brakes, the force of inertia would tend to urge the mercury forwardly and away from its circuit closing position. This would occur unless the angle of declivity of the lever arm were changed so that the movement of the mercury would be more or less uphill. When forward movement of the vehicle is retarded, inertia also acts on the fluid in the container and the fluid tends to rush to the forward end of the container.

The surface level of the fluid changes with the forward rush of the fluid, thus causing the floats to raise or lower the ends of the lever arm to influence movement of the mercury within the switch. However, the fluid in the container is divided in two compartments which are in communication through the small port or opening in the partition or dividing wall. This causes the fluid to seek a level in each compartment and maintain the lever arm in an approximately level position. If the forward movement of the vehicle is retarded as by application of the brakes, inertia would tend to urge the fluid toward the forward end of each compartment and since the surface level in the compartments would be substantially the same, the floats at each end of the lever arm would be contacting the fluid in each compartment in the same relative manner with the result that the angle of declivity of the lever arm would not thereby be changed. Therefore, the natural urge of the mercury to move to the forward end of the switch container and away from its contact making position would not be impeded and the circuit would therefore be opened. In this arrangement, the float members at the ends of the lever arm tends to resist the urge of the lever arm to dip downwardly under the influence of either inertia or gravity. Moreover, in this modified arrangement, the height of the fluid in the container is not so critical as it would not greatly affect the pitch of the lever arm since the height of the floats in compartments would be determined by the height of the fluid in each compartment which at all times would be more or less equal.

The operation of the devices of Figs. 2 to 7 has been made clear from the foregoing description of the system illustrating one use of the invention. However, in the normal position of the switches as shown in Figs. 2 and 5, the mercury switch is shown in circuit making position. It will be obvious to those skilled in the art that if a normal open circuit position of the switch is desired, as may be desired in some control circuits, it is only necessary to reverse the position of the mercury switch.

The invention for purpose of illustration has been shown and described in connection with a series grounded circuit. However, it will be apparent to anyone skilled in the art that it is applicable as well in other circuit arrangements or in those not involving the grounded system.

While the invention has been described in connection with preferred embodiments thereof, it is to be understood that the words which have been used are words of description rather than of limitation and that changes within the purview of the appended claims may be made without departing from the true scope and spirit of the invention in all its aspects.

I claim:

1. An inertia operated switch comprising a container for attachment to a vehicle or the like, a body of fluid of fixed volume in the container, a circuit maker and breaker pivotally mounted on the container above the fluid therein, and means including a float in buoyancy relation to the fluid in the container and rigidly connected to the circuit maker and breaker for controlling the operation of the circuit maker and breaker in response to movement of the body of fluid in the container.

2. An inertia operated switch comprising a container for attachment to a motor vehicle or the like, a predetermined quantity of fluid in the container, a tiltable mercury switch, means for pivotally mounting the switch on the container above the level of the fluid, and means including a single float in buoyancy engagement with the fluid, whereby shifting of position of the body of fluid with respect to the container caused by movements of the vehicle tilts the mercury switch.

3. An inertia operated switch comprising a fluid receptacle, a tiltable mercury switch, means for pivotally supporting said switch on the upper part of the receptacle, said means comprising a weighted lever arm mounted for free pivotal movement in the receptacle and having float means depending therefrom, and a shiftable body of fluid of fixed volume in the receptacle receiving therein the float means in buoyancy relationship to control the tilting of the switch as the body of fluid is caused to shift position in the receptacle.

4. A fluid balanced inertia operated switch comprising a fluid container for attachment to a motor vehicle, a fixed quantity of fluid partially filling the container to a predetermined level, a lever arm having a counterweight at one end thereof and a depending float at the other end in buoyancy relationship with the fluid and defining an operative connection between the fluid and the arm, a mercury switch mounted on the lever arm, electrical connections to said switch from without the container, and means supporting said lever arm for free pivotal movement above the level of the fluid, said switch being adapted to make and break the electrical connections under the influence of the fluid when its level changes position with respect to the container.

5. An inertia operated switch of the character described comprising a container with means for mounting it on a movable body, a lever arm pivotally mounted on the upper part of the container, a mercury switch detachably connected with said lever arm, float means fixed to one end of the lever arm and depending therefrom, and a body of fluid of fixed volume in the container engaging said float means to control the operation of the mercury switch in accordance with the position of the fluid in the container.

6. A switch as defined in claim 5 characterized by a container having two compartments for the body of fluid connected by a restricted passage.

7. A switch as defined in claim 5 characterized by a container having two compartments for the body of fluid connected by a restricted passage, and a float on an end of the lever arm in each compartment.

8. An inertia switch of the character described comprising a container arranged for mounting on a movable support, a tiltable switch assembly pivotally supported on the upper part of the container, said assembly including a float depending from the assembly, and a shiftable body of fluid of predetermined volume in the container cooperating with said float to normally hold the switch assembly in one operative position but adapted to tilt the switch assembly to another operative position when the body of fluid is caused to shift its position within the container.

9. An inertia operated switch of the character described comprising a container having connected compartments for containing fluid, means whereby said container may be fixed to a movable body, a tiltable switch assembly pivotally mounted on the container in the upper part thereof, said switch assembly comprising a lever arm, a mercury switch of the tiltable type in horizontal position on said arm and float means rigidly fixed to the arm and depending therefrom as part of the assembly, and a body of fluid in the container in operative relationship with said float means to control the operation of the switch in accordance with change of position of the body of fluid in the container.

DON C. WISELEY.